United States Patent
Ishikawa et al.

(10) Patent No.: US 8,219,218 B2
(45) Date of Patent: Jul. 10, 2012

(54) PLANT CONTROLLING SYSTEM AND PLANT CONTROLLING METHOD

(75) Inventors: Tetsuro Ishikawa, Kanagawa-ken (JP); Masuo Yamasaki, Tokyo (JP); Akimasa Nakai, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 436 days.

(21) Appl. No.: 12/539,097

(22) Filed: Aug. 11, 2009

(65) Prior Publication Data
US 2010/0042261 A1 Feb. 18, 2010

(30) Foreign Application Priority Data

Aug. 12, 2008 (JP) ................... 2008-208185

(51) Int. Cl.
*G05B 13/02* (2006.01)
(52) U.S. Cl. ......................................... 700/42; 700/282
(58) Field of Classification Search .............. 700/41–43, 700/283, 287; 318/610
See application file for complete search history.

(56) References Cited

U.S. PATENT DOCUMENTS
2004/0016232 A1* 1/2004 Warner et al. .................... 60/602
2004/0081549 A1* 4/2004 Shapiro et al. .................... 415/1

FOREIGN PATENT DOCUMENTS
JP 9-190201 A 7/1997

* cited by examiner

*Primary Examiner* — Kakali Chaki
*Assistant Examiner* — Nathan Laughlin
(74) *Attorney, Agent, or Firm* — Foley & Lardner LLP (57) ABSTRACT

A plant controlling system includes: a velocity-type PID controlling unit to receive a control deviation between a process value and control set value, and calculate and output a manipulated variable deviation for operation targets; a switching unit to switch and then output the manipulated variable deviation from the velocity-type PID controlling unit to the operation targets; manual operating units, having an integration function, that are associated with the operation targets and output either one of the manipulated variable calculated by the integration of the manipulated variable deviation output from the switching unit and a manipulated variable based on a manually set value to the respective associated operation targets based on a control mode of the operation targets; and a switch controlling unit configured to control operation of the switching unit based on the control mode of the operation targets and the manipulated variables output to the operation targets.

8 Claims, 10 Drawing Sheets

FIG. 1

| CONTROL MODE | PRIORITY ORDER 1 | PRIORITY ORDER 2 |
|---|---|---|
| AUTOMATIC MODE (BOTH A AND B) | A | B |
| AUTOMATIC MODE (ONLY A) | A | — |
| AUTOMATIC MODE (ONLY B) | B | — |

| CONTROL MODE | PRIORITY ORDER 1 | PRIORITY ORDER 2 |
|---|---|---|
| AUTOMATIC MODE (BOTH A AND B) | B | A |
| AUTOMATIC MODE (ONLY A) | A | — |
| AUTOMATIC MODE (ONLY B) | B | — |

Prior Art

Prior Art

FIG. 10A

Prior Art

FIG. 10B

PLANT CONTROLLING SYSTEM AND PLANT CONTROLLING METHOD

BACKGROUND OF THE INVENTION

1. Field of the Invention

The present invention relates to a plant controlling system and a plant controlling method in which a process value of a plant is controlled by operating a plurality of operation targets.

2. Description of the Related Art

Figure 8:
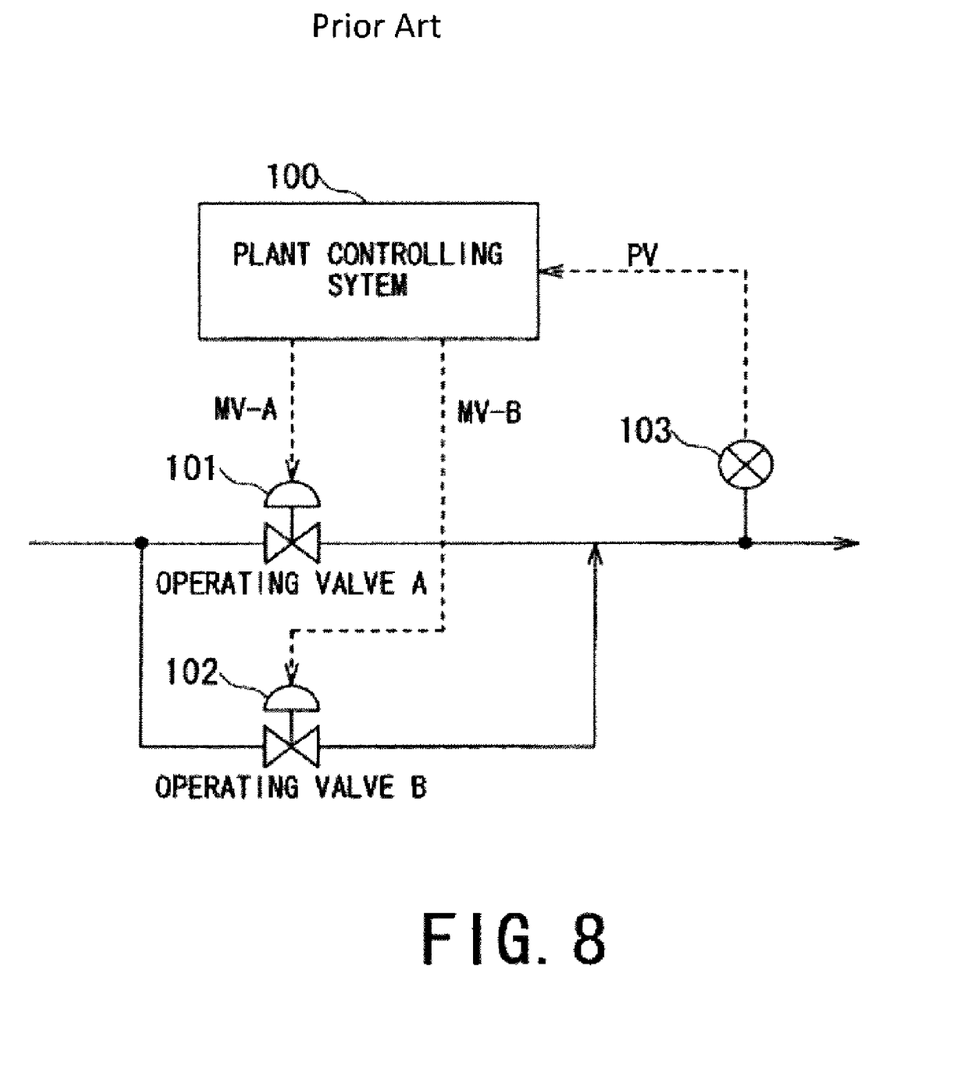
FIG. 8 is a diagram showing a configuration of a conventional plant having a plurality of operating valves.

FIG. 8 is an illustrated diagram showing a general plant provided with operating valves 101 and 102 serving as control valves for adjusting process values, such as pressure and flow rate.

To improve the controllability (controlling function) at low flow rates, two types of operating valves having different capacities, such as a low-capacity operating valve 101 (operating valve A) and a high-capacity operating valve 102 (operating valve B), are arranged in parallel. In general, a plant controlling system 100 controls the low-capacity operating valve 101 and the high-capacity operating valve 102 based on process values detected by a process value detector 103 in such a manner that the low-capacity operating valve 101 is used at low flow rates, and the high-capacity operating valve 102 is brought into use when the flow rate increases.

From the viewpoint of cost, a parallel arrangement of two 50%-capacity operating valves can be used instead of a single 100%-capacity operating valve, or a parallel arrangement of three or more 50%-capacity operating valves including one used as a backup during maintenance can be used.

Figure 9:
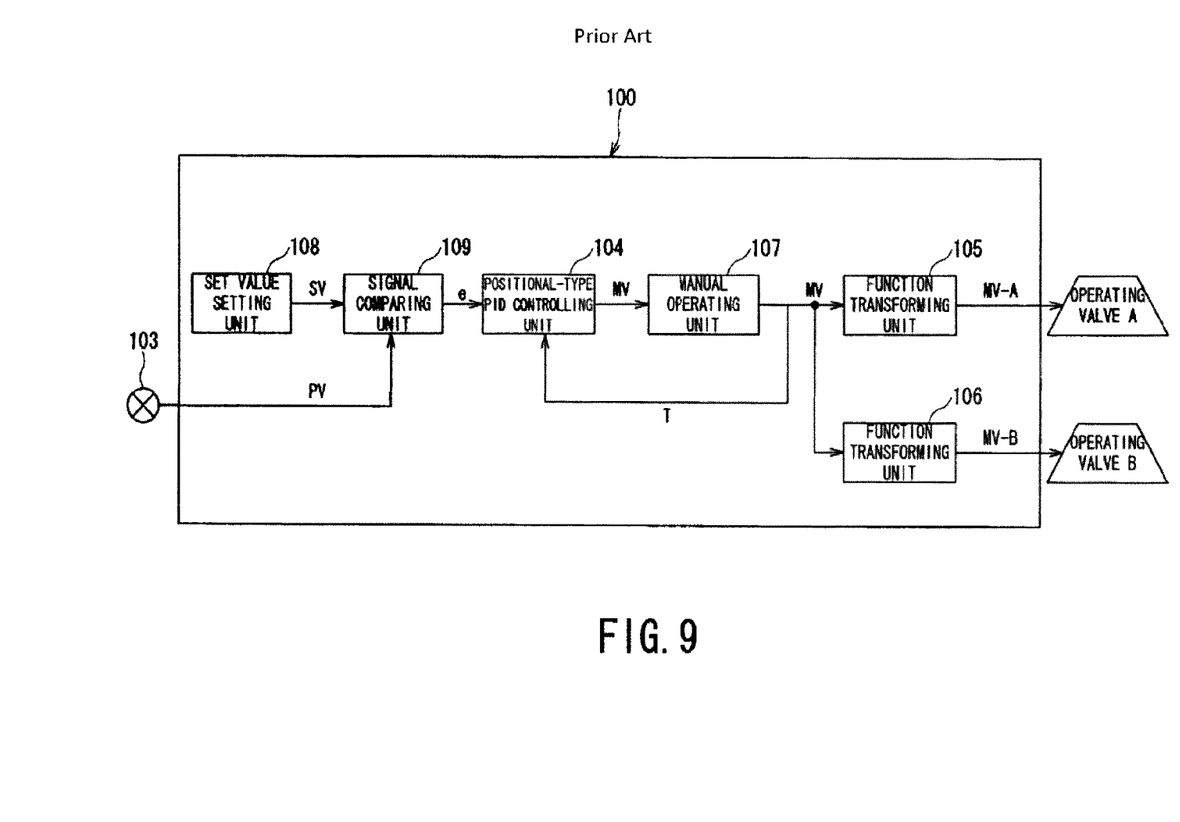
FIG. 9 is a block diagram showing a configuration of a conventional plant controlling system shown in FIG. 8.

For automatic control of the plural operating valves A and B arranged in parallel, which are operation targets, the conventional plant controlling system 100 uses the split control method, in which a manipulated variable MV output from positional-type PID controlling unit 104 is supplied to function transforming units 105 and 106 provided for the operating valves A and B to separately operate each valve as shown in FIG. 9.

In many cases, the conventional plant controlling system 100 further includes manual operating unit 107 that operates the plural operating valves A and B arranged in parallel in a manual mode by switching the operation mode from an automatic mode to the manual mode. In that case, typically, the plural operating valves A and B are regarded as one control target, and one shared manual operating unit 107 is provided upstream from the function transforming units 105 and 106 provided for the operating valves A and B.

More specifically, in the plant controlling system 100, a control set value SV output from set value setting unit 108 and a process value PV detected by the process value detector 103 are input to signal comparing unit 109, and the signal comparing unit 109 determines the deviation between the control set value SV and the process value PV and outputs a control deviation "e". The positional-type PID controlling unit 104 outputs a manipulated variable MV for each of the operating valves A and B according to the control deviation "e".

The manual operating unit 107 receives the manipulated variable from the positional-type PID controlling unit 104 and outputs the manipulated variable MV received from the positional-type PID controlling unit 104 in the case where the operator selects the automatic mode or outputs a manipulated variable MV set by manual operation in the case where the operator selects the manual mode.

Figure 10A:
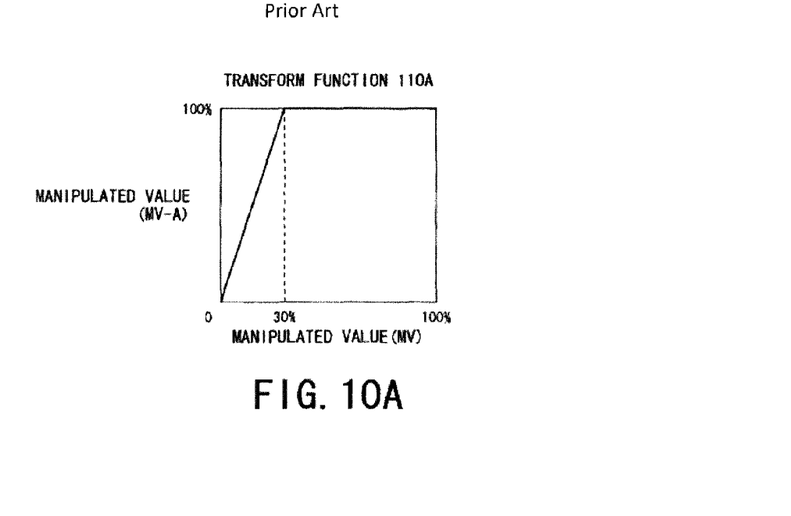
Figure 10B:
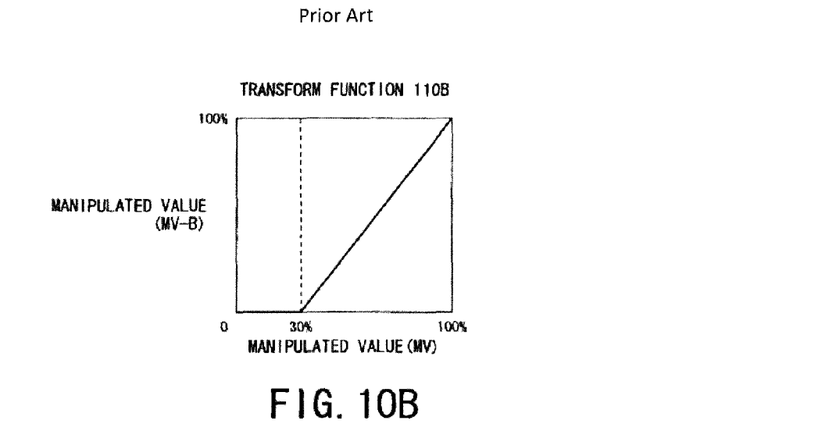

The manipulated variable MV output from the manual operating unit 107 is input to the function transforming units 105 and 106 provided for the operating valves A and B. The function transforming units 105 and 106 transform the manipulated variable MV according to transform functions 110A and 110B shown in FIG. 10, for example, and the resulting manipulated variables MV-A and MV-B are output to the operating valves A and B, respectively.

The transform functions 110A and 110B shown in FIG. 10 are examples in the case where the operating valve A is the low-capacity operating valve 101 and the operating valve B is the high-capacity operating valve 102. The transform function 110A is a function that transforms a manipulated variable MV of 0 to 30% input from the manual operating unit 107 into a manipulated variable MV-A of 0 to 100% to be output. The transform function 110B is a function that transforms a manipulated variable MV of 30 to 100% input from the manual operating unit 107 into a manipulated variable MV-B of 0 to 100% to be output. That is, when the input manipulated variable MV ranges from 0 to 30%, the operating valve A is opened or closed in the range from 0 to 100%, and when the input manipulated variable MV ranges from 30 to 100%, the operating valve B is opened or closed in the range from 0 to 100%.

Furthermore, since the plant controlling system 100 includes the positional-type PID controlling unit 104, tracking is carried out by outputting the manipulated variable MV output from the manual operating unit 107 to the positional-type PID controlling unit 104 as a tracking signal T when the operating valves A and B are switched between the automatic mode and the manual mode, for example, switched from the automatic mode to the manual mode. For example, when the manual operating unit 107 is switched from the manual mode to the automatic mode, the tracking allows the positional-type PID controlling unit 104 to output the manipulated variable MV determined by calculation (integration) beginning with the value of the manipulated variable MV immediately before the switching, and therefore, an abrupt change of the manipulated variable MV can be prevented.

If the separate manual operating unit 107 is provided downstream side from the function transforming units 105 and 106, the manipulated variables MV output from the manual operating unit 107 have different values, and therefore, the tracking based on the manipulated variable MV cannot be achieved. Therefore, the system having one shared manual operating unit 107, such as the plant controlling system 100, is commonly used.

A plant controlling system (a process controlling system) described in Patent Document 1 (Japanese Patent Laid-Open No. 9-190201) includes positional-type PID controlling unit including a velocity-type PID controlling unit and an integrator and carries out tracking by the integrator performing integration of a manipulated variable deviation output from the velocity-type PID controlling unit, function transforming unit (a manipulated variable distributor) transforming (distributing) the manipulated variable calculated by the integrator for each operating valve (operation end) and outputting the resulting value to each operating valve, and calculating a tracking signal from a process quantity controlled by each operating valve and outputting the tracking signal to the integrator.

The conventional plant controlling system 100 shown in FIGS. 8 to 10 has only one shared manual operating unit 107 for the plural operating valves A and B, and therefore, the operating valves A and B cannot be separately manually operated. This does not pose a problem in the normal manual operation. However, for example, if a mechanical problem occurs in any of the plural operating valves A and B and affects automatic control, it is preferred that only the operating valve, to which the problem is caused, is switched to the manual mode and excluded from the targets of automatic control, and the remaining operating valve remains under automatic control.

In addition, the plant controlling system described in the Patent Document 1 has the positional-type PID controlling unit, and therefore, has to carry out logically complicated tracking in order to prevent an abrupt change of the manipulated variable output to an operating valve when the operating valve is switched from the manual mode to the automatic mode, for example.

In addition, in some cases, a flow rate sensor for detecting a process value has to be additionally provided in order to carry out the tracking. As a result, the cost of the plant controlling system substantially increases.

SUMMARY OF THE INVENTION

The present invention was conceived in consideration of the circumstances encountered in the prior art mentioned above and an object thereof is to provide a plant controlling system and a plant controlling method that allow separate manual operation of a plurality of operation targets and can reduce the cost by eliminating a logically complicated tracking for preventing an abrupt change of a manipulated variable output to the operation targets.

The above and other objects can be achieved according to the present invention by providing, in one aspect, a plant controlling system that controls a process value of a plant by operating a plurality of operation targets, comprising:

a velocity-type PID controlling unit configured to receive a control deviation between the process value and a control set value, and calculate and output a manipulated variable deviation for the operation targets;

a switching unit configured to switch and then output the manipulated variable deviation from the velocity-type PID controlling unit to the operation targets;

a plurality of manual operating units, having an integration function or capability, that are associated with the operation targets and output either one of the manipulated variable calculated by the integration of the manipulated variable deviation output from the switching unit and a manipulated variable based on a manually set value to the respective associated operation targets based on a control mode of the operation targets; and a switch controlling unit configured to control operation of the switching unit based on the control mode of the operation targets and the manipulated variables output to the operation targets.

In a preferred embodiment, it may be desired that in a case where the operation targets are operating valves, the switch controlling unit is configured to output a control signal to control the operation of the switching unit based on whether the operating valves are fully opened, the operating valves are fully closed, or the operating valves are in a manual mode, and based on a use priority order that indicates the order of priority of the use of the operating valves.

In this case, it may be desired that whether the operating valves are fully opened and whether the operating valves are fully closed are detected by a manipulated variable detecting unit monitoring the manipulated variable output from the manual operating units each having the integration function, and whether the operating valves are in the manual mode is detected from a manual mode selection signal output from their respective associated manual operating units having the integration function.

It may be also desired that, when the manipulated variable output to the operation target reaches a primary set value for a region where controllability of the operation target is unstable, the switch controlling unit controls the switching unit to output a signal that makes the operation target operate at a certain rate to the manual operating unit having the integration function associated with the operation target and controls the switching unit to output the manipulated variable deviation to the manual operating unit having the integration function associated with the other operation targets.

In this case, it may be desired that, when the manipulated variable output to the operation target reaches an arbitrary secondary set value for a region where the controllability of the operation target is stable, the switch controlling unit controls the switching unit to output a signal that makes the other operation targets operate at a certain rate and then holds the other operation targets at a certain value to the manual operating units having the integration function associated with the other operation targets.

It this case, the plant controlling system may further include a manipulated variable threshold detecting unit that monitors the manipulated variables and detects the occurrence of the manipulated variables output to the operation targets reaching the primary set value and the secondary set value.

The plant controlling system may further include a control mode storing unit configured to determine and store the control mode of the plurality of operation targets and to output a priority order changing signal, which changes the use priority order indicating the priority of use of the operation targets so that an operation target whose control mode is an automatic mode has a higher priority, to the switch controlling unit.

It may be further desired that the control mode storing unit determines the control mode of the plurality of operation targets based on a manual mode selection signal output from the plurality of manual operating units having the integration function associated with the plurality of operation targets.

In another aspect of the present invention, there is also provided a plant controlling method that controls a process value of a plant by operating a plurality of operation targets, including:

a velocity-type PID controlling step of receiving a control deviation between the process value and a control set value and calculating and outputting a manipulated variable deviation for the operation targets;

a switching step of switching and then outputting the manipulated variable deviation calculated in the velocity-type PID controlling step to the operation targets;

a manipulated variable outputting step of outputting either one of a manipulated variable calculated by integration of the manipulated variable deviation output in the switching step and a manipulated variable based on a manually set value to the operation targets based on the control mode of each of the operation targets; and a switch controlling step of controlling the switching operation in the switching step based on the control mode of the operation targets and the manipulated variables output to the operation targets in the manipulated variable outputting step.

According to the plant controlling system of the present invention of the characters mentioned above, the system includes a manual operating unit having an integration function or capability for each of a plurality of operation targets, and accordingly, the plurality of operation targets can be separately manually operated by using the manual operating units with an integration capability.

In addition, since the switching unit outputs the manipulated variable deviation received from the velocity-type PID controlling unit to the operation targets in a switchable manner, an abrupt change of the manipulated variable output to each operation target can be prevented without carrying out logically complicated tracking, and therefore, the cost can be substantially reduced.

According to the plant controlling method of the present invention, the manipulated variable outputting step allows separate manual operation of a plurality of operation targets. In addition, since the manipulated variable deviation output in the velocity-type PID controlling step is output to the operation targets in a switchable manner in the switching step, an abrupt change of the manipulated variable output to each operation target can be prevented without carrying out logically complicated tracking, and therefore, the cost can be substantially reduced.

The nature and further characteristic features of the present invention will be made clearer from the following descriptions made with reference to the accompanying drawings.

BRIEF DESCRIPTION OF THE DRAWINGS

In the accompanying drawings:

FIG. 10 includes graphs FIG. 10A and FIG. 10B showing transform functions of function transforming means shown in FIG. 9.

DESCRIPTION OF THE PREFERRED EMBODIMENTS

In the following, best modes for carrying out the present invention will be described with reference to the accompanying drawings. However, the present invention is not limited to the embodiments described below.

Figure 1:
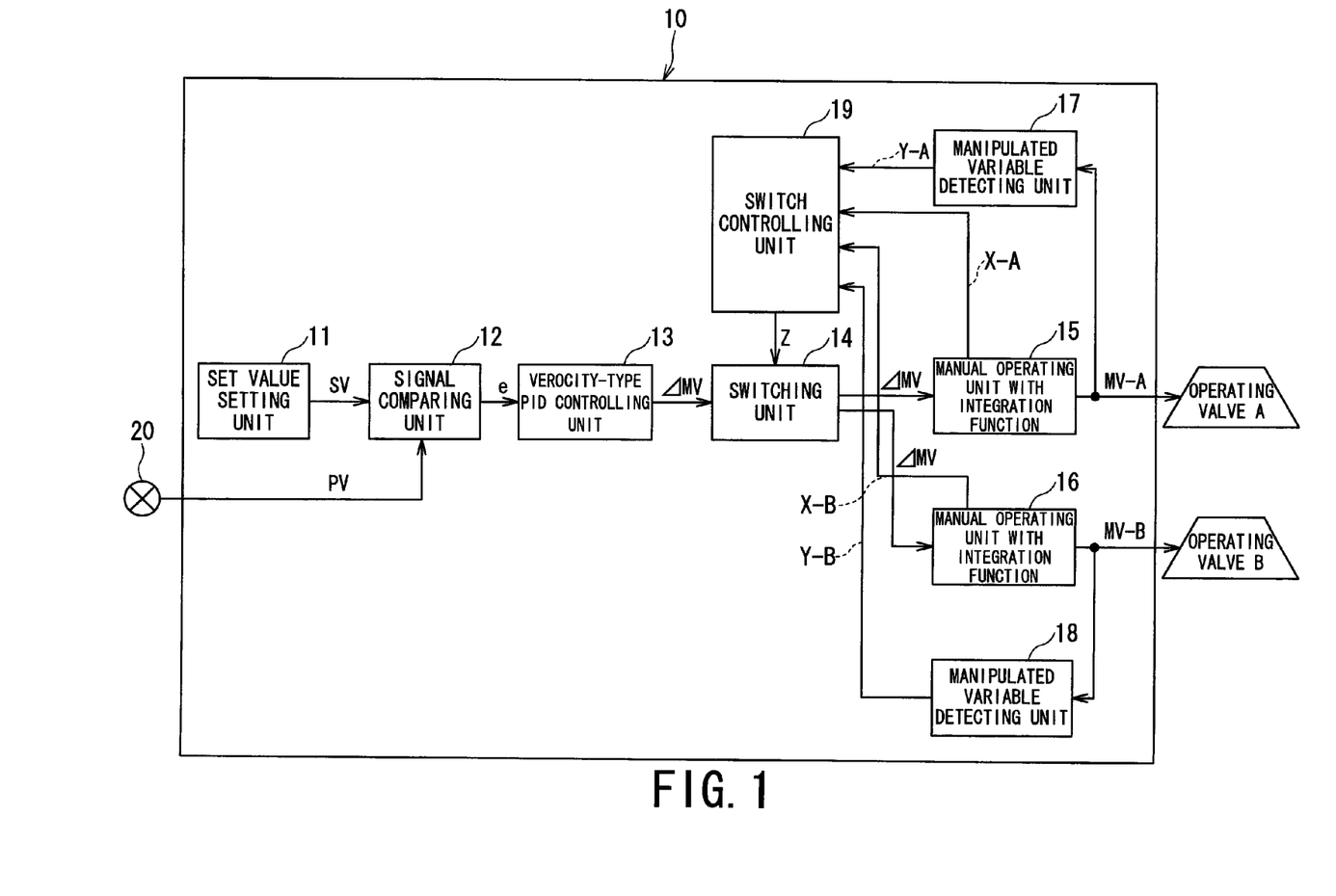
FIG. 1 is a block diagram showing a configuration of a plant controlling system according to a first embodiment of the present invention.
Figure 2:
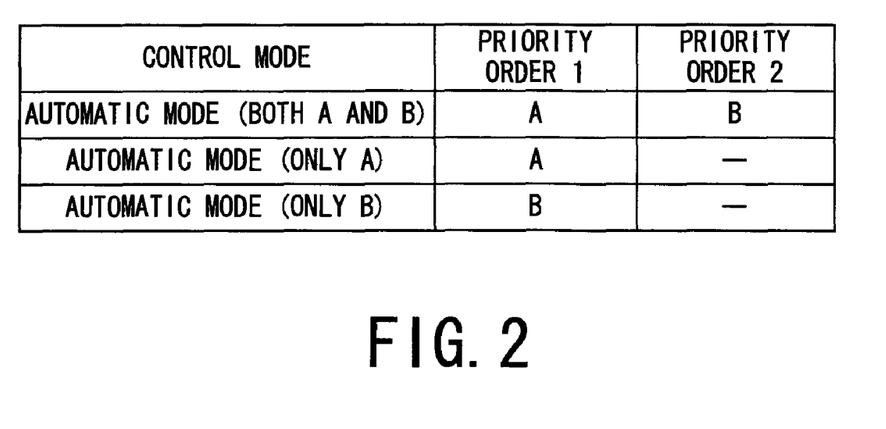
FIG. 2 shows a use priority order table provided in switch controlling means shown in FIG. 1.

First Embodiment (FIGS. 1 and 2)

FIG. 1 is a block diagram showing a configuration of a plant controlling system according to a first embodiment of the present invention.

A plant controlling system 10 shown in FIG. 1 is a split-type controlling system that controls a process value PV (such as pressure and flow rate) of a plant, such as a power generating plant and a chemical plant, by sequentially operating a plurality of operation targets, such as operating valves.

Mores specifically, to improve the controllability at low flow rates, a high-capacity operating valve for high flow rates and a low-capacity operating valve for low flow rates are arranged in parallel as the operating valves, and only the low-capacity operating valve is opened at low flow rates, and the high-capacity operating valve is opened after the low-capacity operating valve is partially or fully opened under the control of the plant controlling system 10, for example. In this embodiment, two operating valves (operating valves A and B) are provided as operation targets, for example.

The plant controlling system 10 described above comprises a set value setting unit 11, a signal comparing unit 12, a velocity-type PID controlling unit 13, a switching unit 14, manual operating units 15 and 16 with an integration function or capability, manipulated variable detecting units 17 and 18 and a switch controlling unit 19.

The set value setting unit 11 is configured to set a control set value SV, which is a target value of the process value PV to be controlled, and outputs the value to the signal comparing unit 12. The signal comparing unit 12 compares a process value PV of the plant detected by a process value detecting unit 20 with the control set value SV from the set value setting unit 11, performs subtraction of the values to calculate a control deviation "e", which is the deviation between the process value PV and the control set value SV, and outputs the control deviation "e" to the velocity-type PID controlling unit 13.

The velocity-type PID controlling unit 13 receives the control deviation "e" from the signal comparing unit 12 and performs a velocity-type PID controlling step, in which a manipulated variable deviation ΔMV (a variation of the manipulated variable) is calculated for the operating valves A and B based on the control deviation "e" and output to the switching unit 14.

Based on a control signal Z described later, the switching unit 14 performs a switching step, in which the manipulated variable deviation ΔMV output from the velocity-type PID controlling unit 13 is switchably output to the manual operating unit 15 with an integration capability (integration function) for the operating valve A or the manual operating unit 16 with an integration capability (integration function) for the operating valve B.

The manual operating unit 15 with the integration capability (function) is associated with the operating valve A, and the manual operating unit 16 with the integration capability is associated with the operating valve B.

The manual operating units 15 and 16 each having integration capability perform a manipulated variable outputting step, in which either one of the manipulated variables MV-A and MV-B calculated by integration of the manipulated variable deviation ΔMV output from the switching unit 14 and the manipulated variables MV-A and MV-B based on a manually set value is output to the operating valves A and B, respectively, depending on the control mode of the operating valves A and B.

More specifically, the manual operating units 15 and 16 receive the manipulated variable deviation ΔMV from the switching unit 14, calculate the manipulated variables MV-A and MV-B by integration of the input manipulated variable deviation ΔMV, and output the manipulated variables MV-A and MV-B to the operating valves A and B, respectively, if an operator selects an automatic mode. On the other hand, if the operator selects a manual mode, the manual operating units 15 and 16 each having the integration capability (function) outputs the manipulated variables MV-A and MV-B based on a manually set value to the operating valves A and B, respectively.

In addition, the manual operating units 15 and 16 store the final manipulated variable MV-A in the automatic or manual mode for the operating valve A and the final manipulated variable MV-B in the automatic or manual mode for the operating valve B and calculate the manipulated variables MV-A and MV-B by integration using the values as an initial value, so that no abrupt change occurs in the output manipulated variables MV-A and MV-B when the control mode is changed.

Furthermore, when the manual mode is selected, the manual operating units 15 and 16 each with the integration capability output manual-mode selection signals X-A and X-B to the switch controlling unit 19.

The manipulated variable detecting units 17 and 18 monitor the manipulated variable MV-A output from the manual operating unit 15 with the integration capability and the manipulated variable MV-B output from the manual operating unit 16 with the integration capability, thereby detecting whether the operating valves A and B are fully opened or fully closed, and output manipulated variable detection signals Y-A and Y-B to the switch controlling unit 19.

In practice, when the operating valve A has a higher use priority (described later), the manipulated variable detecting unit 17 detects that the operating valve A is fully opened from the manipulated variable MV-A and outputs the manipulated variable detection signal Y-A indicating that the operating valve A is fully opened to the switch controlling unit 19. On the other hand, when the operating valve B has a lower use priority, the manipulated variable detecting unit 17 detects that the operating valve A is fully closed from the manipulated variable MV-A and outputs the manipulated variable detection signal Y-A indicating that the operating valve A is fully closed to the switch controlling unit 19.

The manipulated variable detecting unit 18 operates the same way. The manipulated variable detection signal Y-B output from the manipulated variable detecting unit 18 to the switch controlling unit 19 indicates that the operating valve B is fully opened when the operating valve B has a higher use priority or indicates that the operating valve B is fully closed when the operating valve B has a lower use priority.

Based on the control mode of each of the operating valves A and B and the manipulated variables MV-A and MV-B output to the operating valves A and B, the switch controlling unit 19 performs a switch controlling step, in which the switching operation in the switching step performed by the switching unit 14 is controlled. More specifically, the switch controlling unit 19 outputs the control signal Z for controlling the switching operation of the switching unit 14 (which indicates that the manipulated variable deviation ΔMV is to be output to which one of the manual operating units 15 and 16) to the switching unit 14 based on the input manipulated variable detection signal Y-A indicating whether the operating valve A is fully opened or fully closed (the operating valve A is fully opened when the operating valve A has a higher use priority), the input manipulated variable detection signal Y-B indicating whether the operating valve B is fully opened or fully closed (the operating valve B is fully opened when the operating valve B has a higher use priority), the manual-mode selection signal X-A indicating the manual mode of the operating valve A, the manual-mode selection signal X-B indicating the manual mode of the operating valve B, and an incorporated use priority order table (FIG. 2).

The use priority order table shown in FIG. 2 defines the order of priority of use of the operating valves A and B. More specifically, the use priority order table shows the order of output of the manipulated variable deviation ΔMV from the switching unit 14 to the operating valves A and B. According to the use priority order table, when the control mode of both the operating valves A and B is the automatic mode, the operating valve A is used by priority, and when the control mode of either of the operating valves A and B is the manual mode, only one of the operating valves A and B that is in the automatic mode is used, and the other operating mode that is in the manual mode is not used.

The first embodiment mentioned above will operate in the following manner.

In the case where the manual operating units 15 and 16 each having the integration capability are set in the automatic mode, and the operating valves A and B are controlled to be opened, the switch controlling unit 19 operates first so that the switching unit 14 outputs the manipulated variable deviation ΔMV from the velocity-type PID controlling unit 13 to the manual operating unit 15 associated with the operating valve A that has a higher priority according to the use priority order table (FIG. 2). The manual operating unit 15 performs the integration of the manipulated variable deviation ΔMV and outputs the manipulated variable MV-A, which is the result of the integration, to the operating valve A.

In this way, the operating valve A having a higher use priority is first opened. Then, when the operating valve A is fully opened, the manipulated variable detecting unit 17 detects that the operating valve A is fully opened and outputs the manipulated variable detection signal Y-A, which is a signal indicating that the operating valve A is fully opened, to the switch controlling unit 19. Based on the manipulated variable detection signal Y-A, the switch controlling unit 19 outputs the control signal Z to the switching unit 14 to designate the manual operating unit 16 as the destination of the manipulated variable deviation ΔMV.

Then, the switching unit 14 outputs the manipulated variable deviation ΔMV to the manual operating unit 16, and the manual operating unit 16 performs the integration of the manipulated variable deviation ΔMV and outputs the resulting manipulated variable MV-B to the operating valve B.

Similarly, in the case where the manual operating units 15 and 15 each having the integration capability are set in the automatic mode, and the operating valves A and B are controlled to be closed, the switch controlling unit 19 operates first so that the switching unit 14 outputs the manipulated variable deviation ΔMV from the velocity-type PID controlling unit 13 to the manual operating unit 16 associated with the operating valve B.

The manual operating unit 16 performs the integration of the manipulated variable deviation ΔMV and outputs the manipulated variable MV-B, which is the result of the integration, to the operating valve B.

In this way, the operating valve B is first closed. Then, when the operating valve B is fully closed, the manipulated variable detecting unit 18 detects that the operating valve B is fully closed and outputs the manipulated variable detection signal Y-B, which is a signal indicating that the operating valve B is fully closed, to the switch controlling unit 19. Based on the manipulated variable detection signal Y-B, the switch controlling unit 19 outputs the control signal Z to the switching unit 14 to designate the manual operating unit 15 having the integration capability as the destination of the manipulated variable deviation ΔMV.

Then, the switching unit 14 outputs the manipulated variable deviation ΔMV to the manual operating unit 15, and the manual operating unit 15 performs the integration of the manipulated variable deviation ΔMV and outputs the resulting manipulated variable MV-A to the operating valve A.

In the case where the operating valves A and B are initially set in the automatic mode, and then the operating valve A is switched to the manual operation, the operator selects the manual mode for the manual operating unit 15. Then, the manual operating unit 15 outputs the manipulated variable MV-A set by manual operation to the operating valve A and outputs the manual-mode selection signal X-A to the switch controlling unit 19.

Then, according to the use priority order table (FIG. 2), the switch controlling unit 19 outputs the control signal Z to the switching unit 14 so that the switching unit 14 outputs the manipulated variable deviation ΔMV to the manual operating unit 16 having the integration capability. Then, the manual operating unit 16 performs the integration of the manipulated variable deviation ΔMV and outputs the manipulated variable MV-B, which is the result of the integration, to the operating valve B.

Then, if the operator switches the operating valve A to the automatic mode, the manual operating unit 15 having the integration capability stops outputting the manual-mode selection signal X-A, so that the switch controlling unit 19 outputs the control signal Z to the switching unit 14 again so that the switching unit 14 outputs the manipulated variable deviation ΔMV to the manual operating unit 15 associated with the operating valve A, and the switching unit 14 outputs the manipulated variable deviation ΔMV to the manual operating unit 15. The manual operating unit 15 performs the integration of the manipulated variable deviation ΔMV and outputs the manipulated variable MV-A, which is the result of the integration, to the operating valve A.

On the other hand, in the case where the operating valves A and B are initially set in the automatic mode, and then the operating valve A is switched to the manual operation, the operator selects the manual mode for the manual operating unit 16 having the integration capability. Then, the manual operating unit 16 outputs the manipulated variable MV-B set by manual operation to the operating valve B and outputs the manual-mode selection signal X-B to the switch controlling unit 19. Then, according to the use priority order table (FIG. 2), the switch controlling unit 19 outputs the control signal Z to the switching unit 14 so that the switching unit 14 outputs the manipulated variable deviation ΔMV to the manual operating unit 15. Then, the manual operating unit 15 performs the integration of the manipulated variable deviation ΔMV and outputs the manipulated variable MV-A, which is the result of the integration, to the operating valve A.

Under this condition, if the operator switches the operating valve B to the automatic mode, the manual operating unit 16 having the integration capability stops outputting the manual-mode selection signal X-B, and the switch controlling unit 19 outputs the control signal Z to the switching unit 14 again so that the switching unit 14 continues the outputting of the manipulated variable deviation ΔMV to the manual operating unit 15 associated with the operating valve A. The switching unit 14 continues the outputting of the manipulated variable deviation ΔMV to the manual operating unit 15, and the manual operating unit 15 performs the integration of the manipulated variable deviation ΔMV and continues the outputting of the resulting manipulated variable MV-A to the operating valve A.

According to the first embodiment of the characters mentioned above, the following advantageous functions and effects (1) and (2) can be attained.

(1) Since the plant controlling system 10 includes the manual operating units 15 and 16, each having the integration capability, for the operating valves A and B, respectively, the plurality of operating valves A and B can be separately manually operated by the manipulated variable outputting operation performed by the manual operating units 15 and 16.

(2) In the plant controlling system 10, the manipulated variable deviation ΔMV output in the velocity-type PID controlling operation performed by the velocity-type PID controlling unit 13 is output to the manual operating unit 15 associated with the operating valve A or the manual operating unit 16 associated with the operating valve B in a switchable manner performed by the switching unit 14.

The manual operating units 15 and 16 having the integration capability store the final manipulated variable MV-A in the automatic or manual mode for the operating valve A and the final manipulated variable MV-B in the automatic or manual mode for the operating valve B and calculate the manipulated variables MV-A and MV-B by the integration using the values as an initial value, and accordingly, no abrupt change occurs in the output manipulated variables MV-A and MV-B when the control mode is changed. Therefore, the abrupt changes of the manipulated variables MV-A and MV-B output to the operating valves A and B can be prevented without needing any logically complicated tracking. In addition, it is not necessary to locate any additional flow rate sensor or the like for such tracking. As a result, the cost can be substantially reduced.

Figure 3:
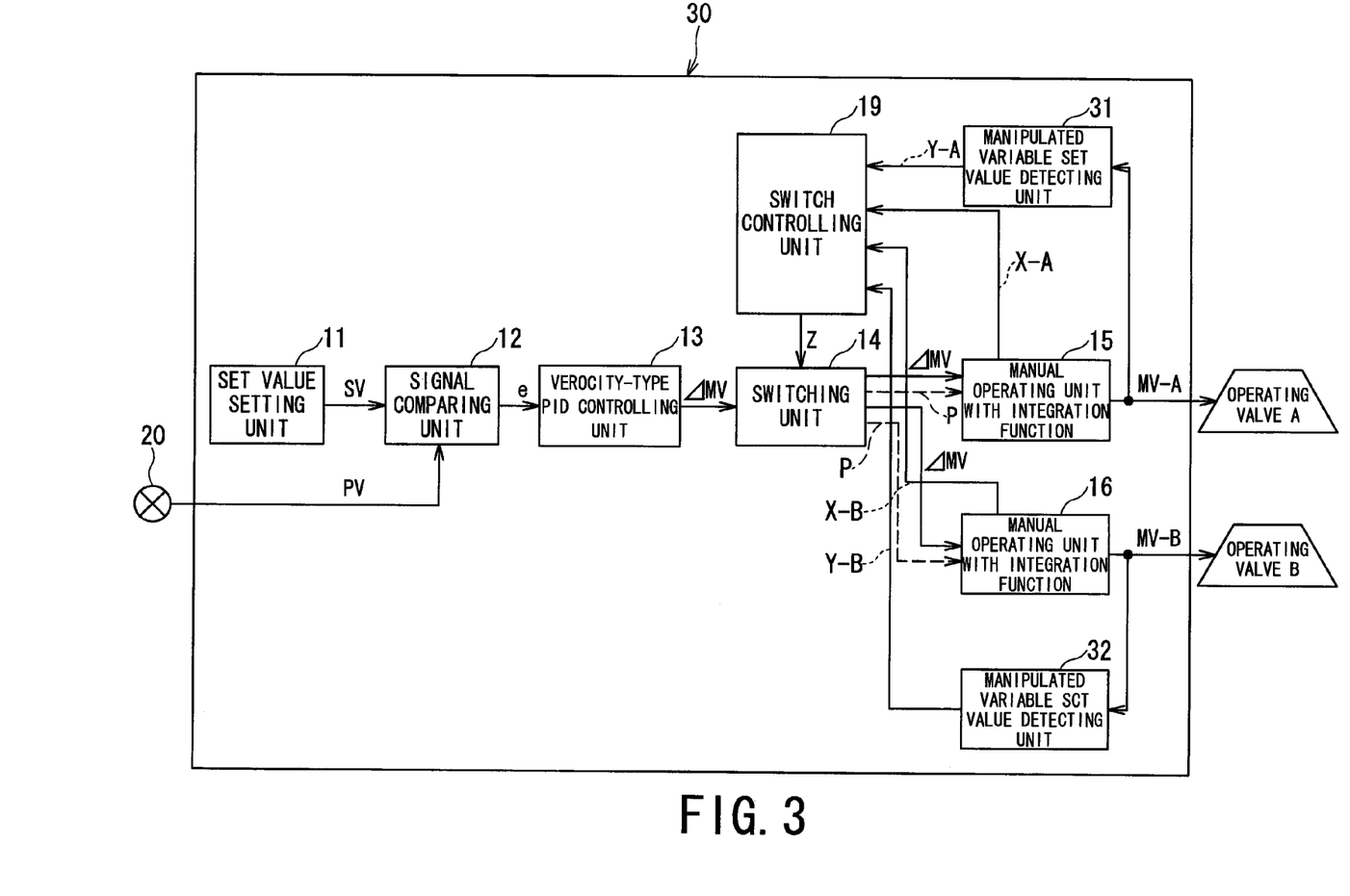
FIG. 3 is a block diagram showing a configuration of a plant controlling system according to a second embodiment of the present invention.
Figure 4:
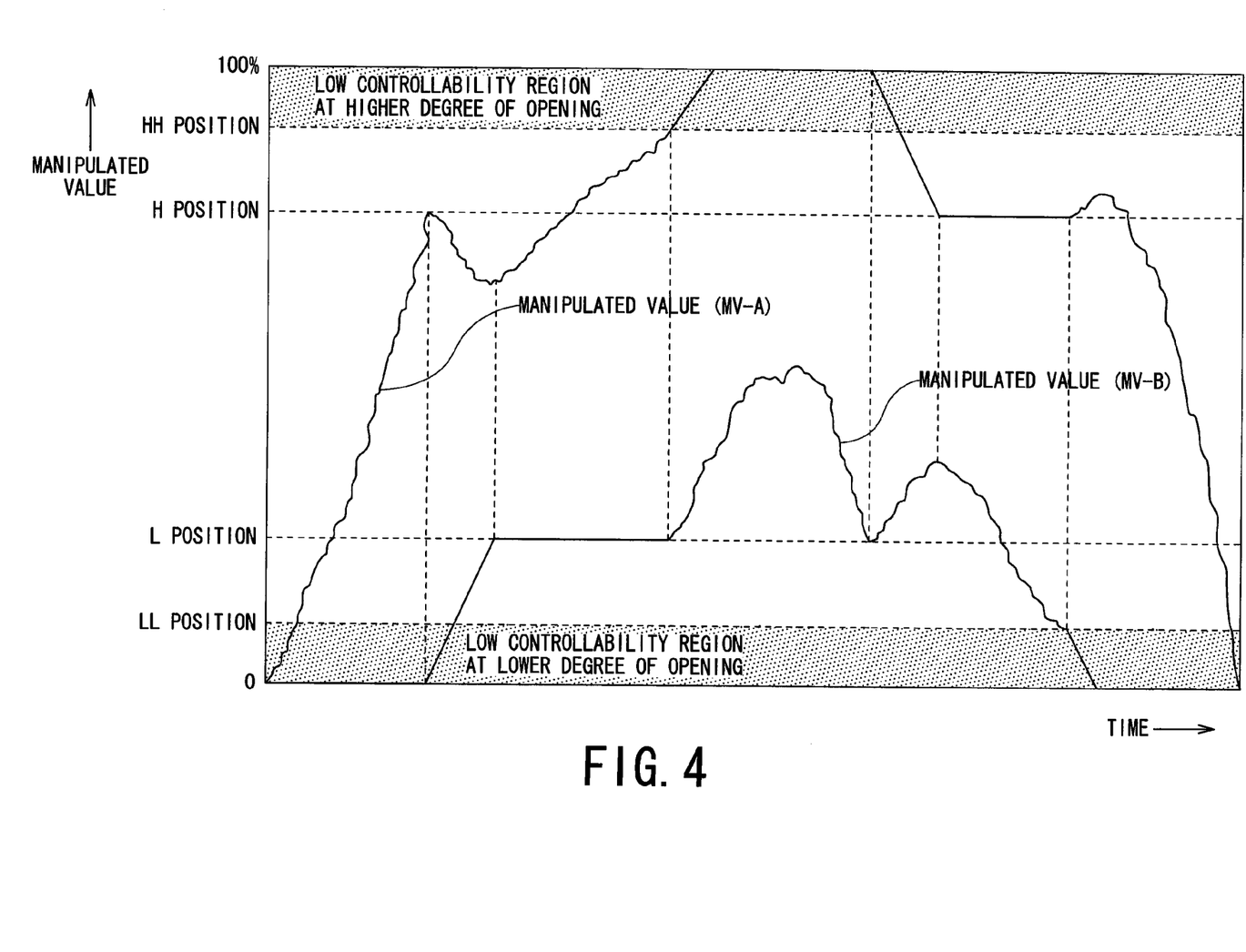
FIG. 4 is a graph showing transitions of manipulated variables for operating valves shown in FIG. 3.

Second Embodiment (FIGS. 3 and 4)

FIG. 3 is a block diagram showing a configuration of a plant controlling system according to a second embodiment of the present invention. In the second embodiment, the same units or members as those in the first embodiment described above are denoted by the same reference numerals, and duplicated descriptions thereof will be simplified or omitted herein.

It is generally known that, in the case where an operation target is an operating valve, the flow characteristics deteriorates, and thus, the controllability or controlling performance is low in a region where the degree of opening of the operating valve is high and a region where the degree of opening of the operating valve is low.

A plant controlling system 30 according to this embodiment differs from the plant controlling system 10 according to the first embodiment described above in that the controllability of the operating valves A and B is improved in the low controllability regions of the operating valves A and B at a higher degree of opening thereof and at a lower degree of opening thereof (see FIG. 4).

More specifically, the plant controlling system 30 has manipulated variable set value detecting units 31 and 32 instead of the manipulated variable detecting units 17 and 18 of the plant controlling system 10.

As shown in FIG. 4, the manipulated variable set value detecting unit 31 takes an HH position, an LL position, an H position, and an L position, in which the HH position serves as a threshold (a primary set value) of the manipulated variable MV-A of the low controllability region at a higher degree of opening in which the controllability of the operating valve A is low; the LL position serves as a threshold (a primary set value) of the manipulated variable MV-A of the low controllability region at a lower degree of opening in which the controllability of the operating valve A is low; the H position at a higher degree of opening serves as an arbitrary reference value (a secondary set value) of the manipulated variable MV-A in the region where the controllability of the operating valve A is high; and the L position is at a lower degree of opening.

Similarly, the manipulated variable set value detecting units 32 takes an HH position, an LL position, an H position and an L position, in which the HH position serves as a threshold (a primary set value) of the manipulated variable MV-B of the low controllability region at a higher degree of opening in which the controllability of the operating valve B is low; an LL position serves as a threshold (a primary set value) of the manipulated variable MV-B of the low controllability region at a lower degree of opening in which the controllability of the operating valve B is low; an H position at a higher degree of opening serves as an arbitrary reference value (a secondary set value) of the manipulated variable MV-B in the region where the controllability of the operating valve B is high; and an L position is at a lower degree of opening.

As shown in FIG. 3, the manipulated variable set value detecting units 31 and 32 monitor the manipulated variable MV-A and MV-B to detect the fact that the manipulated variable MV-A and MV-B reach the HH position, the LL position, the H position and the L position and output the manipulated variable detection signal Y-A and Y-B to the switch controlling unit 19 to inform the switch controlling unit 19 of the detection.

In practical use, when the operating valve A has a higher priority, the manipulated variable set value detecting unit 31 detects the HH position and the H position from the manipulated variable MV-A and outputs the manipulated variable detection signal Y-A to the switch controlling unit 19. Further, when the operating valve A has a lower priority, the manipulated variable set value detecting unit 31 detects the LL position and the L position from the manipulated variable MV-A and outputs the manipulated variable detection signal Y-A to the switch controlling unit 19.

On the other hand, when the operating valve B has a higher priority, the manipulated variable set value detecting unit 32 detects the HH position and the H position from the manipulated variable MV-B and outputs the manipulated variable detection signal Y-B to the switch controlling unit 19. Further, when the operating valve B has a lower priority, the manipulated variable set value detecting unit 32 detects the LL position and the L position from the manipulated variable MV-B and outputs the manipulated variable detection signal Y-B to the switch controlling unit 19.

In the case where the operating valves A and B are in the automatic mode, as shown in FIGS. 3 and 4, when the manipulated variable MV-A or MV-B output to one of the operating valves A and B reaches the H position or L position, the switch controlling unit 19 outputs the control signal Z to the switching unit 14 to control the switching unit 14 to output a signal P to the manual operating units 15 and 16 each having the integration capability associated with the other one of the operating valves A and B so as to be opened or closed at a fixed rate and then held at a fixed degree of opening, the signal P being intended that the manual operating unit 15 or 16 associated with the other one of the operating valves A and B outputs the manipulated variable MV-A or MV-B that is increased or decreased at a fixed rate and then held at the L position or H position.

Furthermore, in the case where the operating valves A and B are in the automatic mode, when the manipulated variable MV-A or MV-B output to one of the operating valves A and B reaches the HH position or LL position, the switch controlling unit 19 outputs the control signal Z to the switching unit 14 so as to control the switching unit 14 and output the signal P to the manual operating unit 15 or 16 associated with the one of the operating valves A and B so as to be opened or closed at a fixed rate and output the manipulated variable deviation ΔMV received from the velocity-type PID controlling unit 13 to the manual operating unit 15 or 16 associated with the other one of the operating valves A and B, the signal P being intended that the manual operating unit 15 or 16 associated with the one of the operating valves A and B outputs the manipulated variable MV-A or MV-B that is increased or decreased at a fixed rate.

Hereunder, an operation of the second embodiment of the characters mentioned above will be described. In the following, a case where both the operating valves A and B are in the automatic mode will be described. However, for example, a case where one of the operating valves A and B is in the automatic mode, and the other is in the manual mode is also possible as in the first embodiment described hereinbefore.

In the case where the manual operating units 15 and 16 each having the integration capability are set in the automatic mode, and the operating valves A and B are controlled to be opened, the switch controlling unit 19 makes the switching unit 14 output the manipulated variable deviation ΔMV received from the velocity-type PID controlling unit 13 to the manual operating unit 15 associated with the operating valve A according to the use priority order table (FIG. 2). The manual operating unit 15 performs the integration of the manipulated variable deviation ΔMV and outputs the manipulated variable MV-A, which is the result of the integration, to the operating valve A.

When the manipulated variable MV-A to the operating valve A reaches the H position, and the manipulated variable set value detecting unit 31 detects the fact, the switch controlling unit 19 supplies the control signal Z to the switching unit 14 based on the manipulated variable detection signal Y-A from the manipulated variable set value detecting unit 31. In response to the control signal Z, the switching unit 14 outputs the signal P (+1, +2, . . . , for example) to the manual operating unit 16 to increase the manipulated variable MV-B to the operating valve B at a fixed rate. Meanwhile, the switching unit 14 continues the outputting of the manipulated variable deviation ΔMV to the manual operating unit 15. When the manipulated variable MV-B reaches the L position, and the manipulated variable set value detecting unit 32 detects the fact and outputs the manipulated variable detection signal Y-B to the switch controlling unit 19, the switch controlling unit 19 supplies the control signal Z to the switching unit 14. In response to the control signal Z, the switching unit 14 outputs the signal P (0, for example) to the manual operating unit 16 to hold the manipulated variable MV-B to the operating valve B at the L position.

When the manipulated variable MV-A reaches the HH position, and the manipulated variable set value detecting unit 31 detects the fact and outputs the manipulated variable detection signal Y-A to the switch controlling unit 19 while the manipulated variable MV-B being held at the L position, the switch controlling unit 19 supplies the control signal Z to the switching unit 14. In response to the control signal Z, the switching unit 14 outputs the signal P (+1, +2, . . . , for example) to the manual operating unit 15 to increase the manipulated variable MV-A at a fixed rate until the operating valve A is fully opened and, at the same time, switches the destination of the manipulated variable deviation ΔMV, which is received from the velocity-type PID controlling unit 13, to the manual operating unit 16. Then, the manual operating unit 16 performs integration of the manipulated variable deviation ΔMV and outputs the manipulated variable MV-B, which is the result of the integration, to the operating valve B.

In the case where the manual operating units 15 and 16 each having the integration capability are set in the automatic mode, and the operating valves A and B are controlled to be closed, the switch controlling unit 19 makes the switching unit 14 output the manipulated variable deviation ΔMV received from the velocity-type PID controlling unit 13 to the manual operating unit 16 associated with the operating valve B according to the use priority order table (FIG. 2). The manual operating unit 16 performs the integration of the manipulated variable deviation ΔMV and outputs the manipulated variable MV-B, which is the result of the integration, to the operating valve B.

When the manipulated variable MV-B to the operating valve B reaches the L position, and the manipulated variable set value detecting unit 32 detects the fact, the switch controlling unit 19 supplies the control signal Z to the switching unit 14 based on the manipulated variable detection signal Y-B from the manipulated variable set value detecting unit 32. In response to the control signal Z, the switching unit 14 outputs the signal P (−1, −2, . . . , for example) to the manual operating unit 15 to increase the manipulated variable MV-A to the operating valve A at a fixed rate.

Meanwhile, the switching unit 14 continues the outputting of the manipulated variable deviation ΔMV to the manual operating unit 16. When the manipulated variable MV-A reaches the H position, and the manipulated variable set value detecting unit 31 detects the fact and outputs the manipulated variable detection signal Y-A to the switch controlling unit 19, the switch controlling unit 19 supplies the control signal Z to the switching unit 14. In response to the control signal Z, the switching unit 14 outputs the signal P (0, for example) to the manual operating unit 15 to hold the manipulated variable MV-A to the operating valve A at the H position.

When the manipulated variable MV-B reaches the LL position, and the manipulated variable set value detecting unit 32 detects this fact and outputs the manipulated variable detection signal Y-B to the switch controlling unit 19 while the manipulated variable MV-A being held at the H position, the switch controlling unit 19 supplies the control signal Z to the switching unit 14. In response to the control signal Z, the switching unit 14 outputs the signal P (−1, −2, . . . , for example) to the manual operating unit 16 to decrease the manipulated variable MV-B at a fixed rate until the operating valve B is fully closed and, at the same time, switches the destination of the manipulated variable deviation ΔMV, which is received from the velocity-type PID controlling unit 13, to the manual operating unit 15. Then, the manual operating unit 15 performs the integration of the manipulated variable deviation ΔMV and outputs the manipulated variable MV-A, which is the result of the integration, to the operating valve A.

This second embodiment attains the following advantage (3) in addition to the advantages (1) and (2) of the first embodiment described hereinbefore.

(3) When one of the operating valves A and B in the region where the operability of the operating valves is low, that is, in the low controllability region at a higher degree of opening or at a lower degree of opening shown in FIG. 4, the one of the operating valves A and B is forcedly fully opened or closed at a fixed rate. At the same time, the other one of the operating valves A and B in the high controllability region is kept operating. Therefore, the operability of the operating valves A and B in the low controllability regions at a higher degree of opening and at a lower degree of opening can be improved.

Figure 5:
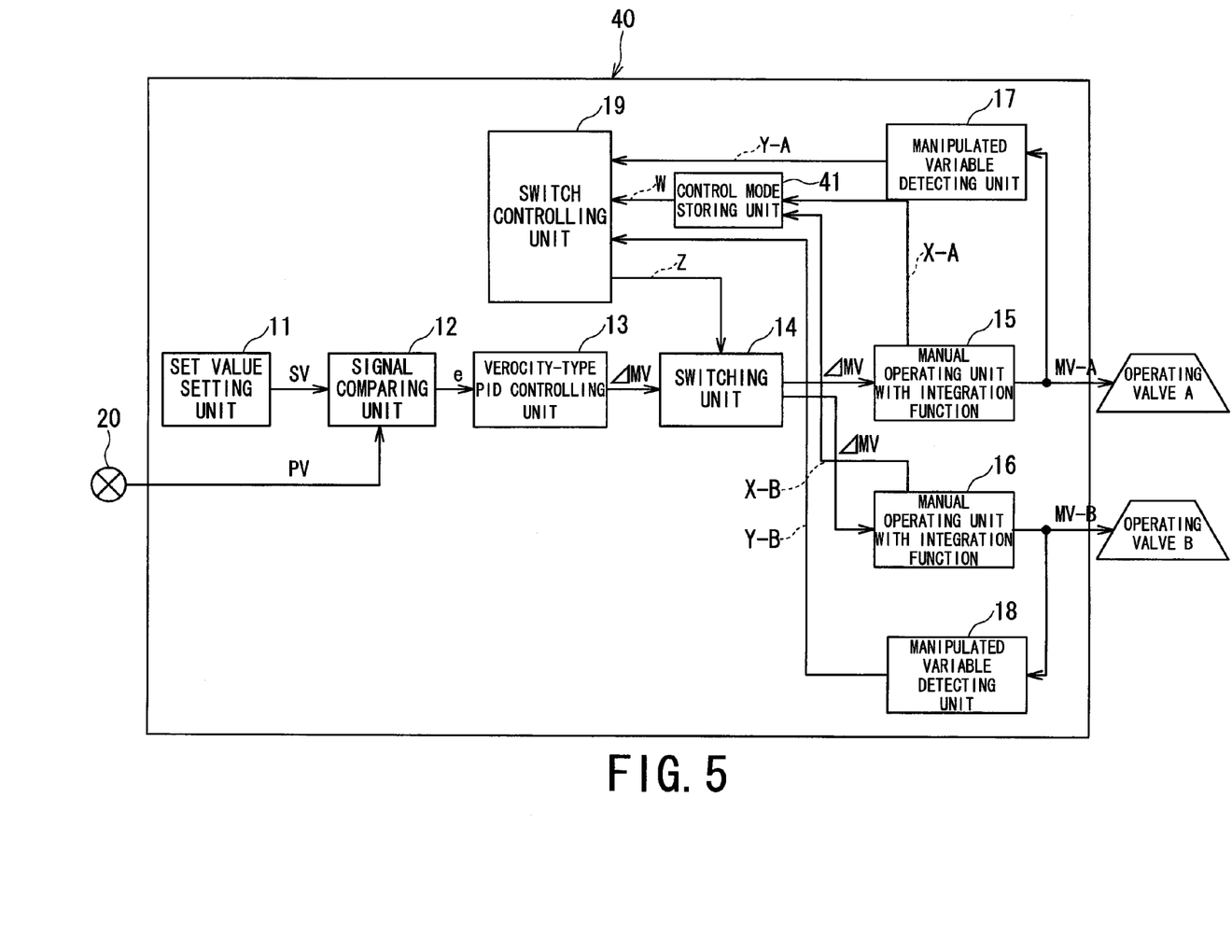
FIG. 5 is a block diagram showing a configuration of a plant controlling system according to a third embodiment of the present invention.
Figure 6:
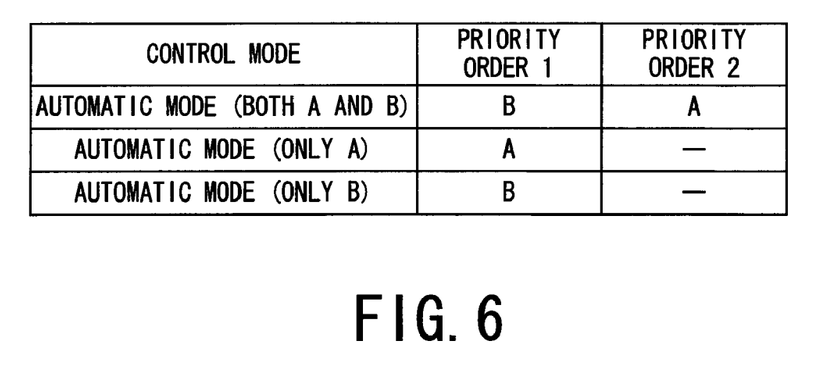
FIG. 6 shows the use priority order table after the priority order is changed by switch controlling means shown in FIG. 5.

Third Embodiment (FIGS. 5 and 6)

FIG. 5 is a block diagram showing a configuration of a plant controlling system according to a third embodiment of the present invention. In the third embodiment, the same units or members as those in the first embodiment are denoted by the same reference numerals, and duplicated descriptions thereof will be simplified or omitted herein.

A plant controlling system 40 according to this third embodiment differs from the plant controlling system 10 according to the first embodiment (FIG. 1) in that control mode storing unit 41 that determines and stores the control mode of a plurality of operating valves A and B is added to the plant controlling system 10.

The control mode storing unit 41 serves to receive and store the manual-mode selection signals X-A and X-B output from the manual operating units 15 and 16 each having the integration capability associated with the operating valves A and B, respectively, to determine the control mode of the operating valves A and B based on the manual-mode selection signals X-A and X-B and to store the control mode. In practice, the control mode storing unit 41 determines that the operating valve A is in the manual mode and stores the fact when the manual-mode selection signal X-A is output from the manual operating unit 15, and determines that the operating valve A is in the automatic mode and stores the fact when the manual-mode selection signal X-A is not output from the manual operating unit 15.

Furthermore, the control mode storing unit 41 determines that the operating valve B is in the manual mode and stores the fact when the manual-mode selection signal X-B is output from the manual operating unit 16, and determines that the operating valve B is in the automatic mode and stores the fact when the manual-mode selection signal X-B is not output from the manual operating unit 16.

Then, the control mode storing unit 41 outputs a priority order changing signal W to the switch controlling unit 19 to change the use priority order of the operating valves A and B in the use priority order table (FIG. 2) stored in the switch controlling unit 19 so that either one of the operating valves A and B that is currently in the automatic mode has a higher use priority.

In response to input of the priority order changing signal W, the switch controlling unit 19 serves to change the priority order of the operating valves A and B in the use priority order table in such a manner that either one of the operating valves A and B that is currently in the automatic mode (the operating valve B in FIG. 6) has a higher priority than the other one of the operating valves A and B that is currently in the manual mode (the operating valve A in FIG. 6).

Hereunder, an operation relating to the change of the use priority order will be described. The remaining operation is the same as the plant controlling system 10 according to the first embodiment.

In the case where the manual operating unit 15 having the integration capability is set in the manual mode, and the manual operating unit 16 having the integration capability 16 is set in the automatic mode, the control mode storing unit 41 stores the current state of the control mode of the manual operating units 15 and 16 and outputs the priority order changing signal W to the switch controlling unit 19 to thereby update the use priority order of the operating valves A and B so that the operating valve B has a higher priority than the operating valve A as shown in FIG. 6.

In this state, if the control mode of the manual operating unit 15 is changed to the automatic mode, based on the updated use priority order table (FIG. 6), the switch controlling unit 19 makes the switching unit 14 continue the outputting of the manipulated variable deviation ΔMV received from the velocity-type PID controlling unit 13 to the manual operating unit 16 associated with the operating valve B.

This third embodiment therefore attains the following advantage (4) in addition to the advantages (1) and (2) of the first embodiment.

(4) The control mode storing unit 41 outputs the priority order changing signal W to the switch controlling unit 19 so as to change the use priority order of the operating valves A and B in the use priority order table stored in the switch controlling unit 19 so that either one of the operating valves A and B that is in the automatic mode has a higher use priority, and the switch controlling unit 19 updates the use priority order of the operating valves A and B in the use priority order table based on the priority order changing signal W. Thus, the plural operating valves A and B can be substantially equally used, and therefore, failure or deterioration of the more frequently used one of the operating valves A and B (the operating valve A, for example) can be prevented.

Figure 7:
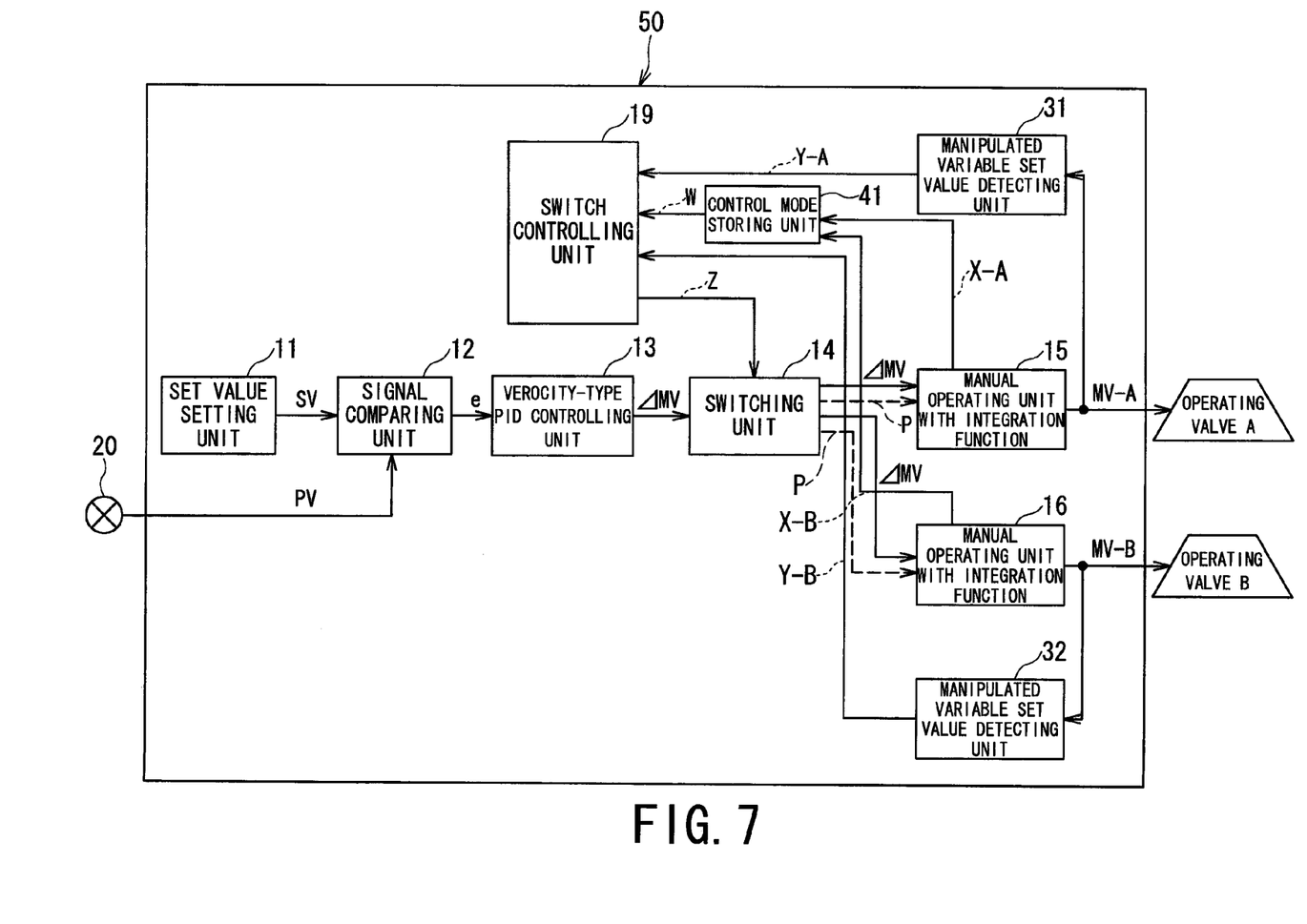
FIG. 7 is a block diagram showing a configuration of a plant controlling system according to a fourth embodiment of the present invention.

Fourth Embodiment (FIG. 7)

FIG. 7 is a block diagram showing a configuration of a plant controlling system according to a fourth embodiment of the present invention. In the fourth embodiment, the same units or members as those in the first, second and third embodiments described hereinbefore are denoted by the same reference numerals, and duplicated descriptions thereof will be simplified or omitted herein.

A plant controlling system 50 according to this fourth embodiment differs from the plant controlling system 30 according to the second embodiment (FIG. 3) in that the control mode storing unit 41 that determines and stores the operation mode of a plurality of operating valves A and B is added to the plant controlling system 30.

Although the plant controlling system 40 according to the third embodiment (FIG. 5) is one in which the plant controlling system 10 according to the first embodiment (FIG. 1) is additionally provided with the control mode storing unit 41, the plant controlling system 50 according to this fourth embodiment is one in which the plant controlling system 30 according to the second embodiment (FIG. 3) is additionally provided with the control mode storing unit 41. Therefore, this fourth embodiment attains the combined advantages (1) to (3) of the second embodiment and the advantage (4) of the third embodiment.

It is further to be noted that the present invention is not limited to the described embodiments and many other changes and modifications may be made without departing from the scopes of the appended claims.

This application claims priority from Japanese Patent Application 2008-208185, filed Aug. 12, 2008, which is incorporated herein by reference in its entirety.

What is claimed is:

1. A plant controlling system that controls a process value of a plant by operating a plurality of operation targets, comprising:
a velocity-type proportional-integral-derivative controlling unit configured to receive a control deviation between the process value and a control set value, and calculate and output a manipulated variable deviation for the operation targets;
a switching unit configured to switch and then output the manipulated variable deviation from the velocity-type proportional-integral-derivative controlling unit to the operation targets;
a plurality of manual operating units, having an integration function, that are associated with the operation targets and output either one of a manipulated variable calculated by the integration of the manipulated variable deviation output from the switching unit and a manipulated variable based on a manually set value to the respective associated operation targets based on a control mode of the operation targets; and
a switch controlling unit configured to control operation of the switching unit based on the control mode of the operation targets and the manipulated variables output to the operation targets, and
wherein the operation targets are operating valves, the switch controlling unit is configured to output a control signal to control operation of the switching unit based on whether the operating valves are fully opened, the operating valves are fully closed, or the operating valves are in a manual mode, and based on a use priority order that indicates the order of priority of the use of the operating valves.

2. The plant controlling system according to claim 1, wherein whether the operating valves are fully opened and whether the operating valves are fully closed are detected by a manipulated variable detecting unit monitoring the manipulated variable output from the manual operating units each having the integration function, and whether the operating valves are in the manual mode is detected from a manual mode selection signal output from their respective associated manual operating units having the integration function.

3. The plant controlling system according to claim 1, wherein, when the manipulated variable output to the operation target reaches a primary set value for a region where controllability of the operation target is unstable, the switch controlling unit controls the switching unit to output a signal that makes the operation target operate at a certain rate to the manual operating unit having the integration function associated with the operation target and controls the switching unit to output the manipulated variable deviation to the manual operating unit having the integration function associated with the other operation targets.

4. The plant controlling system according to claim 3, wherein, when the manipulated variable output to the operation target reaches an arbitrary secondary set value for a region where the controllability of the operation target is stable, the switch controlling unit controls the switching unit to output a signal that makes the other operation targets operate at a certain rate and then holds the other operation targets at a certain value to the manual operating units having the integration function associated with the other operation targets.

5. The plant controlling system according to claim 3, wherein a manipulated variable threshold detecting unit that monitors the manipulated variables detects the occurrence of the manipulated variables output to the operation targets reaching the primary set value and a secondary set value.

6. The plant controlling system according to claim 1, further comprising a control mode storing unit configured to determine and store the control mode of the plurality of operation targets and to output a priority order changing signal, which changes the use priority order indicating the priority of use of the operation targets so that an operation target whose control mode is an automatic mode has a higher priority, to the switch controlling unit.

7. The plant controlling system according to claim 6, wherein the control mode storing unit determines the control mode of the plurality of operation targets based on a manual mode selection signal output from the plurality of manual operating units having the integration function associated with the plurality of operation targets.

8. A plant controlling method that controls a process value of a plant by operating a plurality of operation targets, comprising:
- a velocity-type proportional-integral-derivative controlling step of receiving a control deviation between the process value and a control set value and calculating and outputting a manipulated variable deviation for the operation targets;
- a switching step of switching and then outputting the manipulated variable deviation calculated in the velocity-type proportional-integral-derivative controlling step to the operation targets;
- a manipulated variable outputting step of outputting either one of a manipulated variable calculated by integration of the manipulated variable deviation output in the switching step and a manipulated variable based on a manually set value to the operation targets based on the control mode of each of the operation targets; and
- a switch controlling step of controlling the switching operation in the switching step based on the control mode of the operation targets and the manipulated variables output to the operation targets in the manipulated variable outputting step, wherein the operation targets are operating valves, the switch controlling step is configured to output a control signal to control operation of the switching step based on whether the operating valves are fully opened, the operating valves are fully closed, or the operating valves are in a manual mode, and based on a use priority order that indicates the order of priority of the use of the operating valves.

* * * * *